United States Patent Office 3,060,128
Patented Oct. 23, 1962

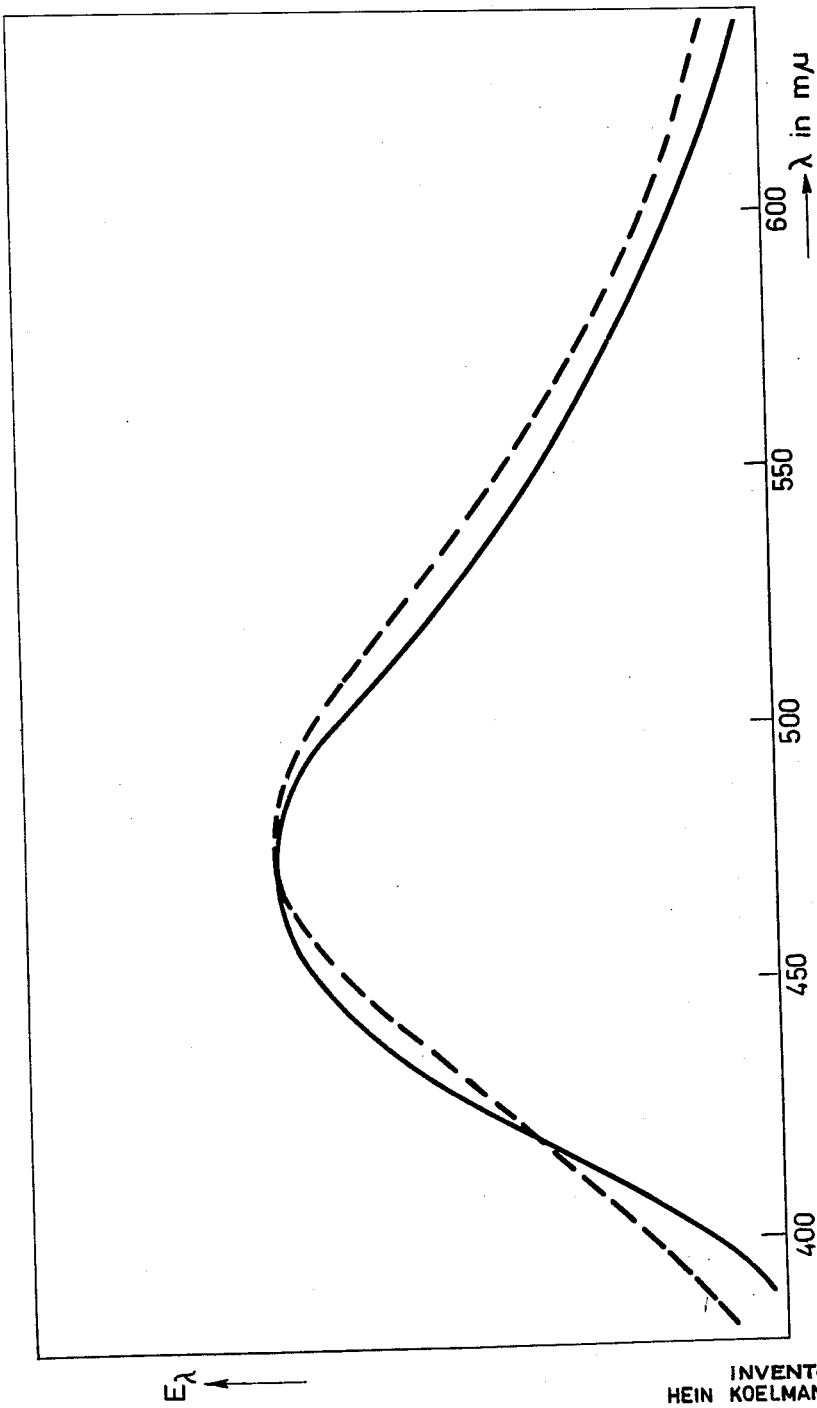

3,060,128
TITANIUM-ACTIVATED CALCIUM GERMANATE
Hein Koelmans and Catharina Maria Cunera Verhagen, Eindhoven, Netherlands, assignors to North America Philips Company, Inc., New York, N.Y., a corporation of Delaware
Filed Mar. 28, 1960, Ser. No. 17,962
Claims priority, application Netherlands Apr. 15, 1959
4 Claims. (Cl. 252—301.4)

This invention relates to a luminescent material for use in a discharge lamp.

One of the most commonly employed luminescent materials giving emission in the blue part of the spectrum, when employed in a low-pressure mercury-vapor discharge lamp, is the antimony activated fluoro-chlorine calcium phosphate corresponding to the formula:

$$3Ca_3(PO_4)_2.Ca(F.Cl):Sb$$

wherein the ratio between the chlorine and fluorine is equal to 1. This material has a high quantum efficiency particularly at the blue portion of the spectrum that is equaled by very few known materials. However, an important disadvantage in the employment of this phosphate is due to the difficulty in manufacturing it because of the relative complexity of its crystal lattice, the high volatility of the antimony and the ease with which the antimony changes its valence.

A principal object of this invention is to provide a luminescent material which at the blue region of the spectrum has a quantum efficiency substantially equivalent to that of the aforesaid blue luminescing antimony activated fluoro-chlorine calcium phosphate.

Another object of this invention is to provide a blue luminescent material having a quantum efficiency substantially equivalent to that of said antimony activated halophosphate but which may be produced in a simpler manner.

According to the invention, there is provided blue luminescing calcium germanate, activated by tetravalent titanium, having the composition: $2CaO.3GeO_2:Ti$.

This calcium germanate when excited by ultraviolet rays of a wavelength of 253.7 m/$\mu$, emits blue light with a maximum at about 470 m/$\mu$.

The blue luminescing calcium germanate, activated by tetravalent titanium of the invention has an emission curve, upon excitation by a radiation of a wavelength of 253.7 m/$\mu$, which is practically equal to that of blue halophosphate of the composition:

$$3Ca_3(PO)_2.Ca(F.Ci):Sb$$

in which the ratio between chlorine and fluorine is equal to 1. Also, the quantum efficiency of the two substances is substantially the same. It is therefore capable of replacing substantially completely said blue luminescing halophosphate. An important advantage over the blue luminescing halophosphate of the luminescent material of the invention, however, consists in the simpler structure of the lattice, so that a very simple method of producing may be employed, and the lack of the presence of the volatile element antimony, which also has the disadvantage of readily changing its valency.

In the luminescent material of the invention, the highest quantum efficiencies are obtained by choosing the titanium content between 0.05 and 0.5 mol percent calculated per germanate molecule.

Apart from the blue luminescing calcium germanate according to the invention, two more compounds of calcium oxide and germanium dioxide may be formed. These are $2CaO.1GeO_2$ and $1CaO.1GeO_2$. If titanium is incorporated as an activator in these compounds, the first-mentioned compound also produces blue light with a maximum at about 470 m/$\mu$, but the latter compound produces substantially no blue light. In the production of the calcium germanate according to the invention of the composition $2CaO.3GeO_2:Ti$, the starting material preferably consists of a mixture of substances in which the quotient of the quantity of calcium oxide, divided by the quantity of germanium oxide in gram molecules is lower than the value corresponding to the formula. By this means apart from the desired calcium germanate of the formula $2CaO.3GeO_2:Ti$ a blue luminescing germanate of the composition: $2CaO.1GeO_2:Ti$ may be produced, but the non-luminescing compound of the formula: $1CaO.1GeO_2:Ti$ is not produced.

The luminescent material of the invention will now be described in greater detail with reference to the following example and drawing, the sole FIGURE of which is a graph showing the intensity of radiation versus the wavelength of the radiation of materials excited by radiation of 253.7 m/$\mu$.

*Example*

33 g. of $CaCO_3$ and 68 g. of $GeO_2$ are mixed together.

This mixture is wetted with 10 mls. of a $TiCl_4$ solution in a mixture of equal parts of water and alcohol, in which, per litre, 0.1 gram-mol of $TiCl_4$ is provided. After drying, the mixture is ground and then heated at 1100° C. in air for two hours. The resultant product luminesces blue upon excitation by a radiation of a wavelength of 253.7 m/$\mu$.

The substance produced in accordance with the above example has an emission curve as indicated in full lines in the graph of the drawing. By way of comparison, both for the shape of the emission curve and the luminous output, the spectral distribution is given (in a broken line) for the emission of blue halophosphate of the formula: $3Ca_3(PO_4)_2.Ca(F.Cl):Sb$, in which the ratio between chlorine and fluorine is equal to 1.

In the production of the luminescent material of the invention, it is essential that the heating of the raw materials be carried out for 0.5 to 2 hours at a temperature lying between 1000° C. and 1200° C. Since the titanium is very stable in regard to changes in its valence, the heating may take place in an oxidizing, reducing or neutral atmosphere. The germanium and calcium may be introduced in the form of oxides of compounds which decompose readily during heating into the oxides, for example, the carbonates and nitrates. However, for the germanium the $GeO_2$ is usually employed.

While we have described our invention in connection with specific embodiments and applications, other modifications thereof will be readily apparent to those skilled in this art without departing from the spirit and scope of the invention as defined in the appended claims.

What we claim is:

1. A blue luminescing phosphor for use in a low-pressure mercury-vapor discharge lamp, said phosphor being a titanium-activated calcium germanate of the composition: $2CaO.3GeO_2:Ti$.

2. The phosphor of claim 1, wherein the titanium content lies between 0.05 and 0.5 mol percent, calculated per germanate molecule.

3. The phosphor of claim 2, wherein the titanium content lies between 0.09 and 0.14 mol percent, calculated per germanate molecule.

4. A method of producing a blue luminescing, titanium-activated calcium germanate of the composition:

$$2CaO.3GeO_2:Ti$$

as claimed in claim 1, characterized in that in the mixture of starting substances, from which, by heating at a temperature between 1000° C. and 1200° C., for half an hour to two hours, the germanate is produced, the quotient of the quanity of calcium oxide, divided by the quantity of germanium oxide in gram molecules is lower than the value corresponding to the formula of the final, blue luminescing product.

References Cited in the file of this patent

UNITED STATES PATENTS

| | | |
|---|---|---|
| 2,118,091 | Leverenz | May 24, 1938 |
| 2,171,145 | Leverenz | Aug. 29, 1939 |
| 2,182,087 | Leverenz | Dec. 5, 1939 |
| 2,257,667 | Aschermann | Sept. 30, 1941 |
| 2,402,760 | Leverenz | June 25, 1946 |
| 2,457,054 | Leverenz | Dec. 21, 1948 |

FOREIGN PATENTS

| | | |
|---|---|---|
| 447,231 | Canada | Mar. 16, 1948 |